United States Patent
Nilsson et al.

(10) Patent No.: US 12,553,760 B2
(45) Date of Patent: Feb. 17, 2026

(54) MICROWAVE TRANSMISSION ARRANGEMENT WITH ENCAPSULATION, COMMUNICATION AND/OR MEASUREMENT SYSTEM AND RADAR LEVEL GAUGE SYSTEM

(71) Applicant: Rosemount Tank Radar AB, Mölnlycke (SE)

(72) Inventors: Leif Nilsson, Linköping (SE); Håkan Fredriksson, Linköping (SE); Magnus Ohlsson, Norsholm (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 345 days.

(21) Appl. No.: 17/690,188

(22) Filed: Mar. 9, 2022

(65) Prior Publication Data

US 2022/0299352 A1    Sep. 22, 2022

(30) Foreign Application Priority Data

Mar. 22, 2021   (EP) .................................... 21163942

(51) Int. Cl.
   *G01F 23/284*   (2006.01)
   *H04B 1/40*   (2015.01)

(52) U.S. Cl.
   CPC .............. *G01F 23/284* (2013.01); *H04B 1/40* (2013.01)

(58) Field of Classification Search
   CPC ............ G01F 23/284; H04B 1/40; H01Q 1/38
   See application file for complete search history.

(56) References Cited

U.S. PATENT DOCUMENTS 8,763,453 B2 * 7/2014 Reimelt ................. H01Q 1/225
                                                                333/252
8,866,562 B2 * 10/2014 Shimura ................. H01P 5/024
                                                                333/33

(Continued)

FOREIGN PATENT DOCUMENTS

WO          0205690 A1      1/2002
WO    WO-03025523 A1 *     3/2003    ........... G01F 23/284
WO    WO-2019091231 A1 *   5/2019

OTHER PUBLICATIONS

Extended European Search Report from European Patent Application No. 21163942.2, dated Oct. 11, 2021.

*Primary Examiner* — William Kelleher
*Assistant Examiner* — Noah Yi Min Zhu
(74) *Attorney, Agent, or Firm* — Westman, Champlin & Koehler, P.A.

(57) ABSTRACT

A microwave transmission arrangement, comprising a microwave circuit board including a patch; microwave transceiver circuitry coupled to the patch; an electrically conductive hollow waveguide arranged to guide microwave signals between a first end and a second end; and a separator sheet sandwiched between the microwave circuit board and the first end of the hollow waveguide, the separator sheet being configured to allow passage of microwaves between the patch and the hollow waveguide through the separator sheet. The separator sheet is included in an encapsulation separating an encapsulated interior of the microwave transmission arrangement from an exterior outside the encapsulation, the patch, and the microwave transceiver circuitry being in the encapsulated interior, and the hollow waveguide being in the exterior outside the encapsulation.

11 Claims, 5 Drawing Sheets

(56) References Cited

U.S. PATENT DOCUMENTS

| | | | |
|---|---|---|---|
| 2005/0083229 A1* | 4/2005 | Edvardsson | G01F 23/284 |
| | | | 342/198 |
| 2006/0255950 A1* | 11/2006 | Roeder | G06K 7/10336 |
| | | | 340/572.7 |
| 2010/0231438 A1* | 9/2010 | Ohlsson | G01F 23/284 |
| | | | 73/290 V |
| 2014/0007674 A1 | 1/2014 | Weinzierle et al. | |
| 2014/0009323 A1* | 1/2014 | Weinzierle | H01P 5/08 |
| | | | 342/124 |
| 2016/0103007 A1* | 4/2016 | Fredriksson | G01S 7/02 |
| | | | 342/124 |
| 2018/0267161 A1* | 9/2018 | Nagaishi | G01S 7/03 |
| 2019/0063983 A1* | 2/2019 | Schultheiss | G01S 7/03 |
| 2019/0097294 A1* | 3/2019 | Rusch | H01P 3/16 |
| 2019/0310125 A1* | 10/2019 | Farmanyan | G01S 13/106 |
| 2021/0091454 A1* | 3/2021 | Plet | H01Q 5/42 |
| 2022/0173520 A1* | 6/2022 | Manholm | H05K 1/024 |

* cited by examiner

MICROWAVE TRANSMISSION ARRANGEMENT WITH ENCAPSULATION, COMMUNICATION AND/OR MEASUREMENT SYSTEM AND RADAR LEVEL GAUGE SYSTEM

CROSS-REFERENCE TO RELATED APPLICATION

This application claims priority to European Patent Application No. 21163942.2, filed Mar. 22, 2021, the content of which is hereby incorporated by reference in its entirety.

TECHNICAL FIELD OF THE INVENTION

The present invention relates to a microwave transmission arrangement, to a communication and/or measurement system and to a radar level gauge system.

TECHNICAL BACKGROUND

The current trend in microwave transmission for measurement as well as for communication is towards higher frequencies. In particular in comparison with existing radar level gauging systems, this increases the demand for available energy which in turn requires new strategies for fulfilling the requirements for Ex certification for explosive environments, and/or new solutions to allow high capacity energy storage.

One such strategy is to encapsulate the electronics of the microwave transmission arrangement (such as according to IEC 610079-11, clause 6.6) to avoid spark-ignition requirements. This means that the amount of energy storage (capacitance) may be increased but difficulties remain since a signal line from the microwave transceiver circuitry of the microwave transmission arrangement needs to comply with all applicable Ex-related requirements, while still being able to radiate sufficient microwave energy.

U.S. 2014/0007674 discloses one approach, in which a dielectric sealing element is arranged inside the hollow waveguide to provide a seal between a main region of the waveguide and a start region of the waveguide, forming a cavity in which a radiator element is arranged.

In the event of leakage at the interface between the dielectric sealing element and the hollow waveguide, inside the hollow waveguide, there is a risk that flammable gas can come into contact with the radiator element, and other unprotected parts of the microwave transceiver circuitry.

It would therefore be desirable to provide an improved microwave transmission arrangement, having an improved encapsulation solution.

SUMMARY OF THE INVENTION

In view of the above, a general object of the present invention is to provide an improved microwave transmission arrangement, in particular a microwave transmission arrangement having an improved encapsulation solution.

According to an aspect of the present invention, it is therefore provided a microwave transmission arrangement, comprising: a microwave circuit board including a dielectric carrier, and a first conductor pattern on a first side of the dielectric carrier, the first conductor pattern including a patch for radiating or receiving microwave signals, a patch line, and a first ground plane surrounding the patch and the patch feed line; microwave transceiver circuitry arranged on the microwave circuit board, the microwave transceiver circuitry having an output for providing microwave signals generated by the microwave transceiver circuitry and an input for receiving microwave signals, wherein the patch line is connected to at least one of the output and the input; an electrically conductive hollow waveguide extending from a first end to a second end and arranged to guide microwave signals radiated by the patch from the first end towards the second end, and/or guide received microwave signals from the second end towards the first end; and a separator sheet sandwiched between the microwave circuit board and the first end of the hollow waveguide, the separator sheet being configured to allow passage of microwaves between the patch and the hollow waveguide through the separator sheet, wherein the separator sheet is included in an encapsulation separating an encapsulated interior of the microwave transmission arrangement from an exterior outside the encapsulation, the patch, the patch line, and the microwave transceiver circuitry being in the encapsulated interior, and the hollow waveguide being in the exterior outside the encapsulation.

The "microwave transceiver circuitry" may be implemented as one functional unit capable of transmitting and receiving microwave signals, or may be a system comprising separate transmitter and receiver units.

The present invention is based on the realization that the sensitivity to leaks at a sealing interface can be avoided by sandwiching a separator sheet between the microwave circuit board and the first end of the hollow waveguide. In this way, any leakage along a contact surface between the first end of the hollow waveguide and the separator sheet can be prevented from reaching the patch or the patch line. Through the sandwiching of the separator sheet between the microwave circuit board and the first end of the hollow waveguide, the separator sheet will be in direct contact with the microwave circuit board, so that there is no internal cavity between the microwave circuit board and the separator sheet. Advantageously, the hollow waveguide may be pressed towards the microwave circuit board, so that pressure is applied on the separator sheet.

Through such a configuration, with the separator sheet sandwiched between the microwave circuit board and the first end of the hollow waveguide, the only possible leakage path between the interior of the hollow waveguide and the patch or patch line on the microwave circuit board is through the material of the separator sheet, which is much more unlikely to occur than through a sealing between two parts, so that the sealing provided by the separator sheet can be considered to be infallible.

For efficient transmission of microwaves through the separator sheet, the separator sheet may advantageously comprise a dielectric portion arranged between the patch and the interior of the hollow waveguide. This dielectric portion then acts as a microwave transmission window. The dielectric portion may suitably extend through the entire thickness of the separator sheet between the interior of the hollow waveguide and the patch in the microwave circuit board. Moreover, the dielectric portion may advantageously extend across substantially the entire inner cross-sectional area of the hollow waveguide, at the first end of the hollow waveguide.

For leakage safety, and for avoiding transmission of energy through dielectric breakdown of the dielectric portion, the thickness of the separator sheet, in the dielectric portion, may be at least 0.5 mm.

According to various embodiments, furthermore, the separator sheet may comprise a dielectric substrate having a first side and a second side opposite the first side; a first conductive layer on the first side of the substrate; a second conductive layer on the second side of the substrate; and a plurality of conductive vias passing through the dielectric substrate and electrically conductively connecting the first conductive layer and the second conductive layer.

For efficient grounding of the electrically conductive hollow waveguide, the first conductive layer of the separator sheet may be electrically conductively connected to the first ground plane of the microwave circuit board; and the second conductive layer of the separator sheet may be electrically conductively connected to the first end of the hollow waveguide.

The respective electrical connections may advantageously be achieved by pressing the hollow waveguide towards the microwave circuit board, thereby pressing the first conductive layer of the separator sheet against the first ground plane of the microwave circuit board and the second conductive layer of the separator sheet against the first end of the hollow waveguide.

The microwave transmission arrangement according to various embodiments of the present invention may advantageously be included in a communication and/or measuring system, further comprising processing circuitry coupled to the microwave transceiver circuitry and configured to control the microwave transceiver circuitry to provide microwave signals and/or to perform signal processing on microwave signals received by the microwave transceiver circuitry.

According to one particular embodiment, this microwave transmission arrangement may advantageously be included in a radar level gauge system for determining the filling level of a product in a tank, the radar level gauge system further comprising an antenna coupled to the second end of the hollow waveguide of the microwave transmission arrangement for radiating an electromagnetic transmit signal from the microwave transmission arrangement towards a surface of the product and for returning an electromagnetic reflection signal resulting from reflection of the electromagnetic transmit signal at the surface back towards the microwave transmission arrangement; and processing circuitry coupled to the microwave transceiver circuitry comprised in the microwave transmission arrangement and configured to determine the filling level based on a timing relation between the transmit signal and the reflection signal.

For all embodiments, it should be noted that the processing circuitry may be provided as one device or several devices working together.

In summary, the present invention thus relates to a microwave transmission arrangement, comprising a microwave circuit board including a patch; microwave transceiver circuitry coupled to the patch; an electrically conductive hollow waveguide arranged to guide microwave signals between a first end and a second end; and a separator sheet sandwiched between the microwave circuit board and the first end of the hollow waveguide, the separator sheet being configured to allow passage of microwaves between the patch and the hollow waveguide through the separator sheet. The separator sheet is included in an encapsulation separating an encapsulated interior of the microwave transmission arrangement from an exterior outside the encapsulation, the patch, and the microwave transceiver circuitry being in the encapsulated interior, and the hollow waveguide being in the exterior outside the encapsulation.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

In the present detailed description, various embodiments of the microwave transmission arrangement according to the present invention are mainly discussed with reference to a radar level gauge system.

It should be noted that this by no means limits the scope of the present invention, which equally well includes, for example, microwave transmission arrangements used for other applications, such as communication systems, for example microwave links as may, for example, be used in 5G communication systems.

Figure 1:
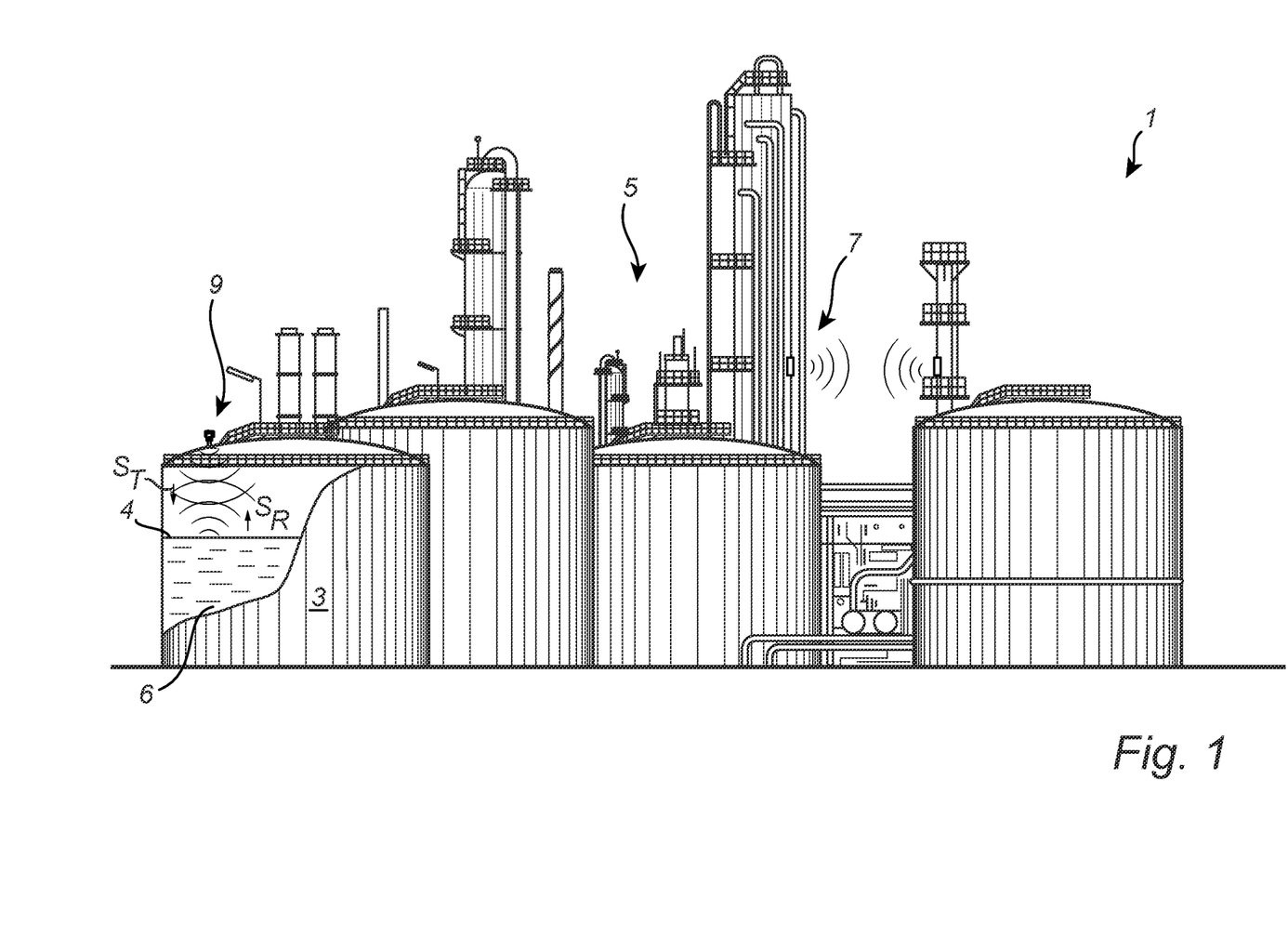
FIG. 1 schematically shows example applications of the microwave transmission arrangement according to embodiments of the present invention.

FIG. 1 schematically shows an industry site 1, such as a process industry, for example a refinery or similar. As is schematically shown in FIG. 1, the industry site 1 includes tanks 3 and various process equipment 5. Depending on the type of industry, there may be hazardous environments on the industry site 1, requiring equipment used on the site 1 to be certified according to applicable standards. Suitably, at least some of the equipment used on the site 1 may fulfill relevant requirements for intrinsic safety, meaning that the equipment is certified as not being capable of causing ignition in a hazardous environment. Examples of applicable standards for intrinsic safety are IEC610079-0 and IEC610079-11.

Examples of equipment on the industry site 1 that may advantageously be configured to fulfill requirements for intrinsic safety may include the microwave link 7 and the radar level gauge system 9 schematically indicated in FIG. 1. Common to such systems according to embodiments of the present invention is that they each include a microwave transmission arrangement for transmission of microwave signals between transceiver circuitry and an antenna. As is well known to those skilled in the relevant art, various specifications may be different for equipment used in a microwave link 7 and a radar level gauge system 9, respectively. For instance, the antenna configuration may be specifically adapted to the environment where the antenna is arranged. However, the microwave transmission arrangement used in the various applications may have substantially the same configuration.

Figure 2:
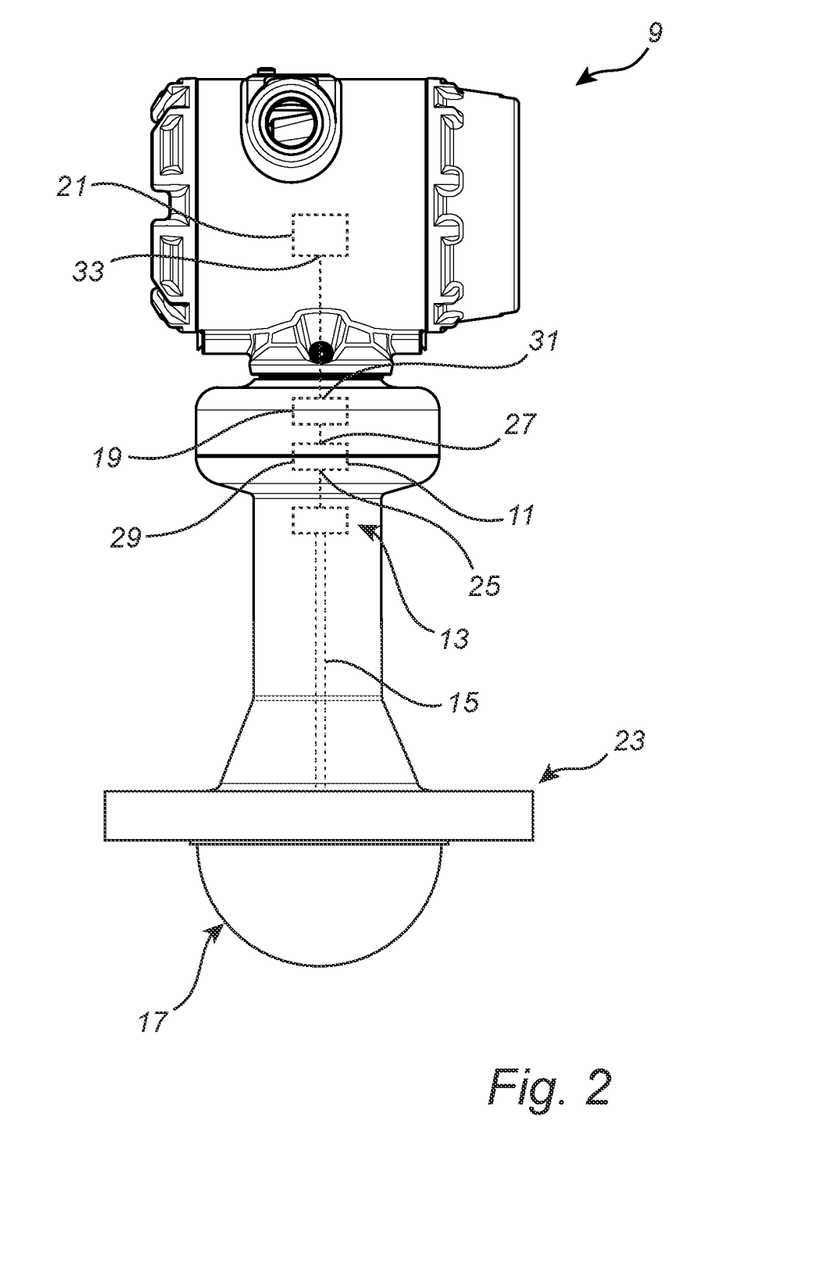
FIG. 2 is a schematic side view of one example application of the microwave transmission arrangement according to embodiments of the present invention, in the form of an exemplary radar level gauge system.

FIG. 2 is a schematic side view of one example application of the microwave transmission arrangement according to embodiments of the present invention, in the form of an exemplary radar level gauge system 9.

As is conceptually indicated in FIG. 2, the radar level gauge system 9 comprises microwave transceiver circuitry 11, a microwave transmission arrangement 13 including a hollow waveguide 15, an antenna 17, processing circuitry 19, communication circuitry 21, and a process connection, here in the form of a flange 23.

The microwave transceiver circuitry 11 has an output 25—here shown as a combined microwave output and input port—for providing microwave signals generated by the microwave transceiver circuitry 11, and an input 25 for receiving microwave signals. As is schematically indicated in FIG. 2, the microwave transceiver circuitry 11 also has a measurement data interface 27 coupled to a corresponding measurement data interface 29 of the processing circuitry 19. The processing circuitry 19 additionally has a communication interface 31 that is coupled to a corresponding communication interface 33 of the communication circuitry 21.

In operation of the radar level gauge system 9, the processing circuitry 19 controls the microwave transceiver circuitry 11 to generate and transmit microwave transmit signals. The microwave transmit signals are provided by the microwave transceiver circuitry 11 to the microwave transmission arrangement 13, which transitions the microwave transmit signals to the antenna 17. Referring briefly to FIG. 1, the antenna 17 radiates the microwave transmit signals $S_T$ towards a surface 4 of a product 6 in the tank 3. The microwave transmit signals $S_T$ are at least partly reflected back towards the antenna 17 as microwave reflection signals $S_R$. The microwave reflection signals $S_R$ hit the antenna 17, and are guided by the hollow waveguide 15 and the microwave transmission arrangement 13 transitions the microwave reflection signals $S_R$ from signals guided by the hollow waveguide 15 to signals carried by a strip-line on a microwave circuit board (not shown in FIG. 2) back to the microwave transceiver circuitry 11. Based on a timing relation between the microwave transmit signals $S_T$ and the microwave reflection signals $S_R$, the processing circuitry 19 determines the filling level of the product 6 in the tank 3 in a, per se, well-known manner. A communication signal indicative of the determined filling level is communicated to an external host by the communication circuitry 21.

In the microwave link 7, there may be no determination of a distance, but instead data may be encoded on a transmitted signal, and data may be retrieved by decoding a received signal, in ways well-known to those skilled in the relevant art.

Figure 3A:
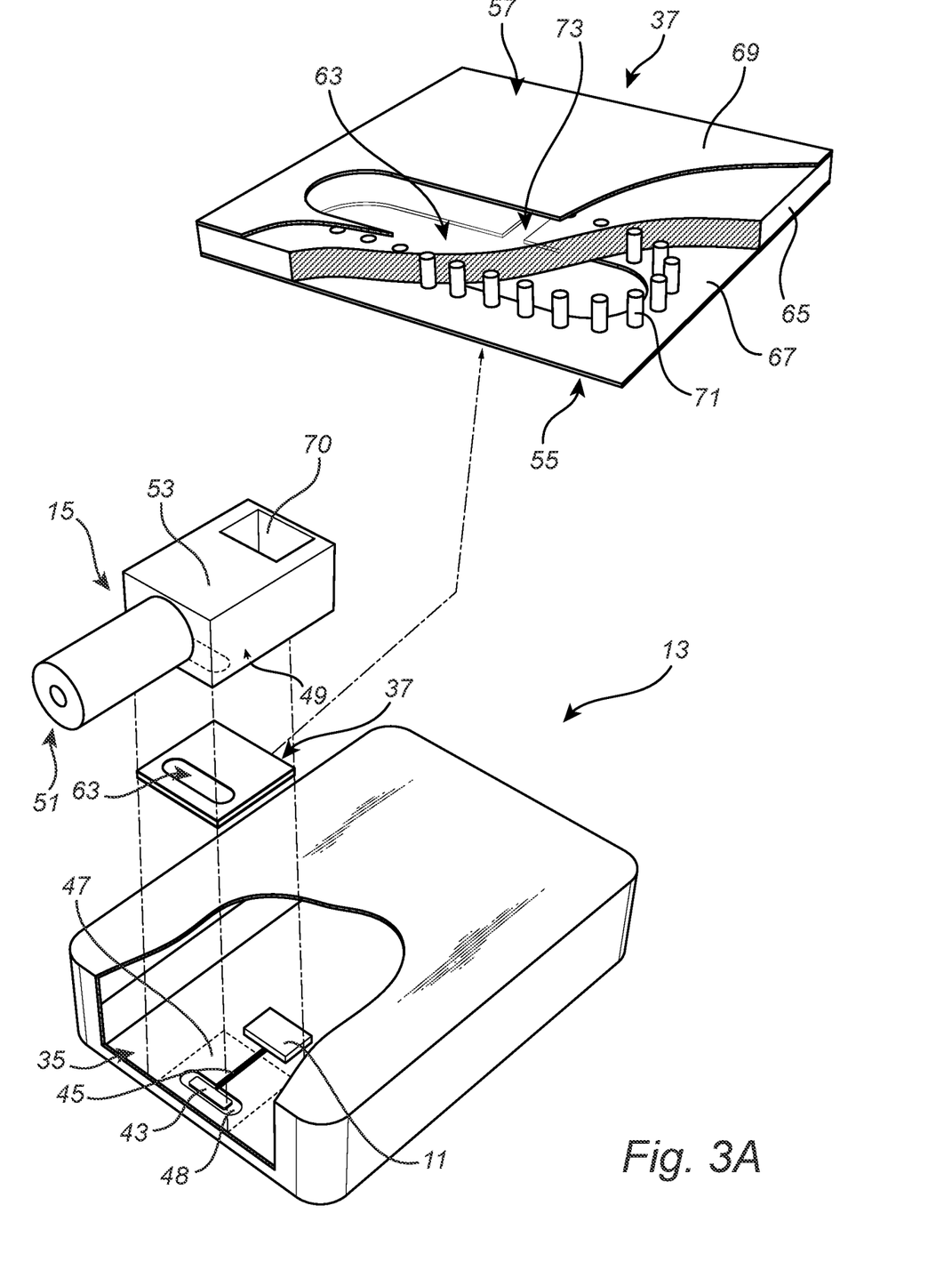
FIGS. 3A-C schematically illustrate a microwave transmission arrangement according to example embodiments of the present invention.
Figure 3B:
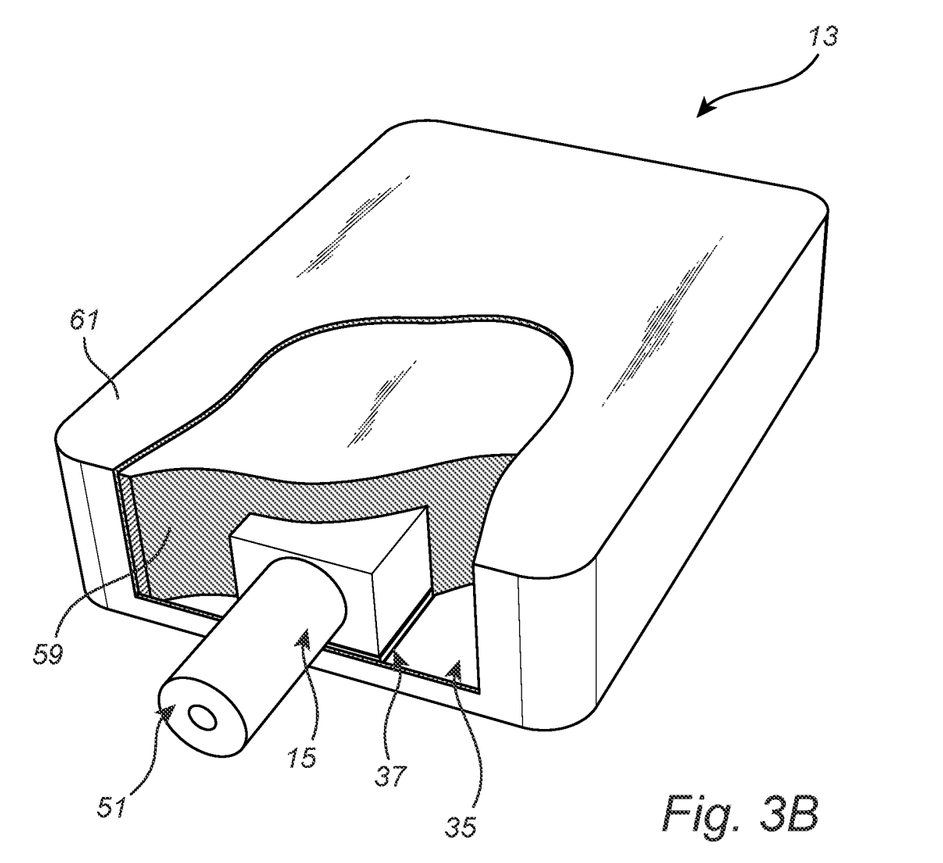
Figure 3C:
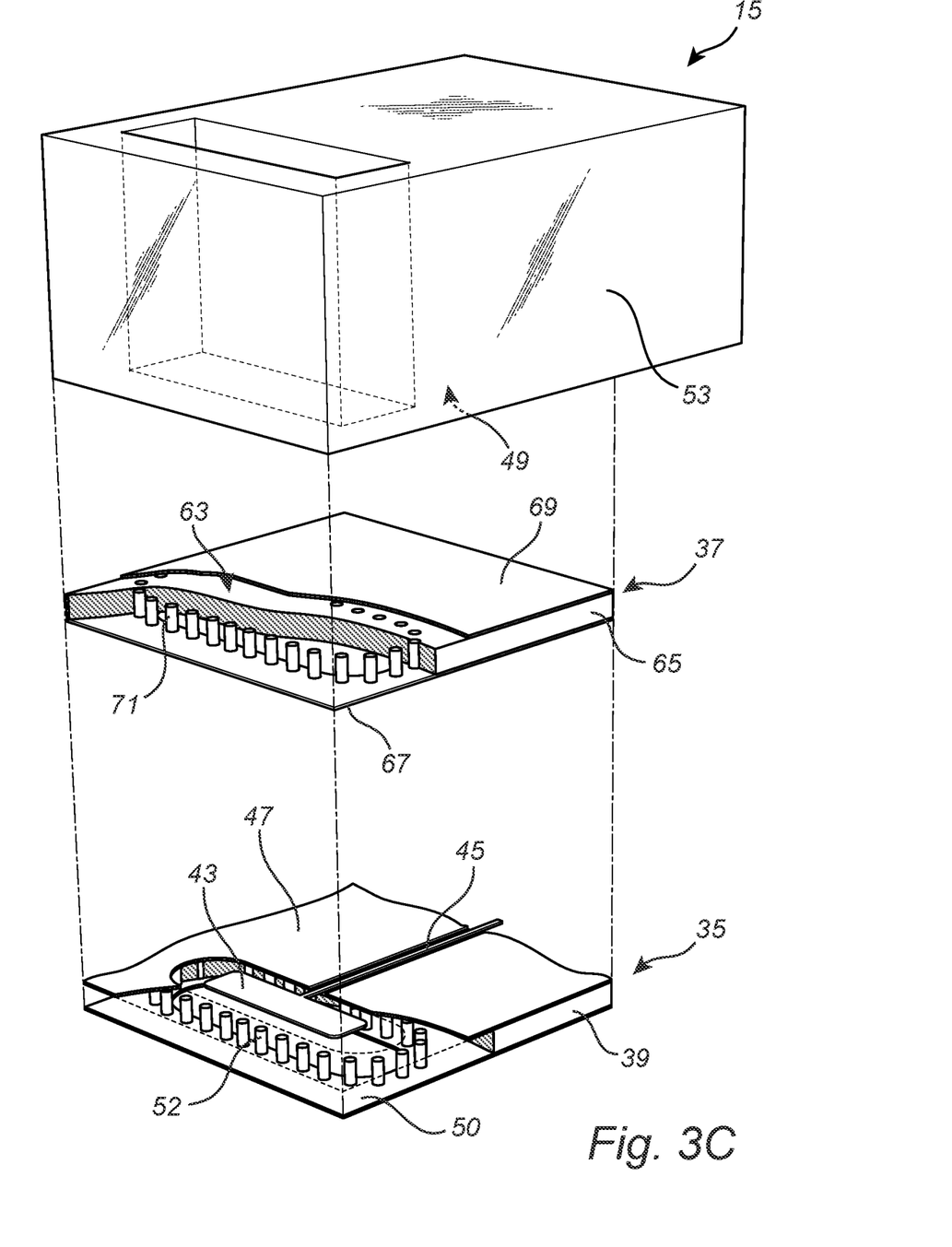

FIGS. 3A-C schematically illustrate a microwave transmission arrangement 13 according to example embodiments of the present invention. The microwave transmission arrangement 13 of the kind schematically shown in FIGS. 3A-C may be used in various systems, such as the microwave link 7 and the radar level gauge system 9 in FIG. 1.

Referring first to FIG. 3A, which is an exploded view of the microwave transmission arrangement 13, the microwave transmission arrangement 13 comprises a microwave circuit board 35, microwave transceiver circuitry 11, here in the form of an MMIC (monolithic microwave integrated circuit), an electrically conductive hollow waveguide 15, and a separator sheet 37.

As is shown in FIG. 3A, but better visible in FIG. 3C, the microwave circuit board 35 includes a dielectric carrier 39 and a first conductor pattern on a first side (the top side in FIG. 3A) of the dielectric carrier 39. The first conductor pattern includes a patch 43 for radiating or receiving microwave signals, a patch line 45, and a first ground plane 47 surrounding the patch 43 and the patch line 45. There is a gap 48 in the first conductor pattern separating the patch 43 and the first ground plane 47. The patch 43 is here shown as being substantially rectangular, because the patch 43 is adapted to the hollow waveguide 15. For other waveguide configurations, other patch configurations may be suitable, as will be understood to those skilled in the relevant art.

In the example configuration in FIGS. 3A-C (best seen in FIG. 3C), the microwave circuit board 35 additionally has a second conductor pattern on a second side of the dielectric carrier 39, opposite the first side. The second conductor pattern includes a second ground plane 50 arranged opposite the patch 43 and the first ground plane 47. As is schematically shown in FIG. 3C the first ground plane 47 and the second ground plane 50 are interconnected by electrically conducting vias 52 extending through the dielectric carrier 39.

As can be seen in FIG. 3A, the microwave transceiver circuitry 11 is arranged on the microwave circuit board 35. Although not shown in the figures, the microwave transceiver circuitry 11 has an output for providing microwave signals generated by the microwave transceiver circuitry 11 and an input for receiving microwave signals. The output and the input may be separate from each other, but in the embodiments shown in FIGS. 3A-C, the output and the input of the microwave transceiver circuitry are embodied by a common I/O, that is connected to the patch 43, via the patch line 45.

The electrically conductive hollow waveguide 15 extends from a first end 49 to a second end 51, and is arranged to guide microwave signals radiated by the patch 43 from the first end 49 towards the second end 51 and to guide received microwave signals from the second end 51 towards the first end 49.

The hollow waveguide 15 has a hollow interior that is defined by an electrically conductive waveguide body 53. Accordingly, the first end 49 of the hollow waveguide 15 includes a first end surface of the electrically conductive waveguide body 53 and a waveguide opening facing the patch 43.

The hollow waveguide 15 is configured to guide microwave signals in a predefined wavelength range, in a predefined propagation mode along a signal propagation path defined by the hollow waveguide 15. The predefined wavelength range may, for example, be 77-81 GHz, and the predefined propagation mode may, for example, be TE10, but other wavelength ranges and/or propagation modes are possible and may be beneficial depending on the application.

In the exemplary embodiment of FIGS. 3A-C, a single patch 43 is provided for transmitting and receiving microwaves. It should be noted that the first conductor pattern may equally well include separate transmitter and receiver patches, respectively. Such separate transmitter and receiver patches may advantageously be combined with a hollow waveguide having separate hollow waveguide openings at the first end 49 of the hollow waveguide, one hollow waveguide opening for each patch in the first conductor pattern.

The separator sheet 37 is sandwiched between the microwave circuit board 35 and the first end 49 of the hollow waveguide 15, and is configured to allow passage of microwaves between the patch 43 (or patches in embodiments with a plurality of patches) and the hollow waveguide 15 through the separator sheet 37.

The separator sheet 37 is included in an encapsulation separating an encapsulated interior of the microwave transmission arrangement 13 from an exterior outside the encapsulation. The patch 43, the patch line 45, and the microwave transceiver circuitry 11 are in the encapsulated interior, and the hollow waveguide 15 (the interior of the hollow waveguide) is in the exterior outside the encapsulation.

As is perhaps best seen in FIG. 3B, the separator sheet 37 is sandwiched between a top surface of the microwave circuit board 35 and the first end 49 of the hollow waveguide (the first end surface of the electrically conductive waveguide body 53 as well as the waveguide opening facing the patch 43). Hereby, a first side 55 of the separator sheet 37 is in contact with the top surface of the microwave circuit board 35 and a second side 57 of the separator sheet 37 is in contact with the first end 49 of the hollow waveguide 15.

In addition to the separator sheet 37, the above-mentioned encapsulation includes a potting compound 59 that at least partly fills a housing 61 of the microwave transmission arrangement 13. The hollow waveguide 15 may be pressed against the microwave circuit board 35, for instance using screws (not shown in FIGS. 3A-C). Hereby, potting compound 59 can be kept out of the pressurized stack formed by the microwave circuit board 35, the separator sheet 37, and the hollow waveguide 15. However, potting compound 59 will cover edge surfaces of the separator sheet 37, so that the interfaces between the hollow waveguide 15 and the separator sheet 37, and between the separator sheet 37 and the microwave circuit board 35 are covered by the potting compound 59.

As is schematically shown in FIG. 3A, there may be a through-going hole 70 in the waveguide body 53, configured to accommodate the MMIC 11. Before providing the potting compound 59, a barrier may be provided for preventing the potting compound 59 from entering a narrow space between the MMIC 11 and the microwave circuit board 35. Such a barrier may, for example, be provided by dispensing, through the hole 70, another potting compound with a higher viscosity, and/or by inserting a sealing body in the through-hole 70.

Referring to FIG. 3A, the separator sheet 37 may comprise a dielectric portion 63 arranged between the patch 43 and an interior of the hollow waveguide 15, at the first end 49 of the hollow waveguide 15 to allow microwave signals to propagate between the patch 43 and the interior of the hollow waveguide 15, through the dielectric portion 63 of the separator sheet 37. To provide for an explosion proof configuration, in compliance with the relevant standards, a thickness of the separator sheet 37, in the dielectric portion 63, may be at least 0.5 mm. The material of the dielectric portion may advantageously be robust and durable, and have a relatively high dielectric strength. Examples of suitable dielectric materials include low loss substrates suitable for high frequency microwave use. Examples of suitable materials may include ceramics, PTFE, and hybrid configurations including PTFE with various fillers.

To provide for a favorable combination of the sealing and electrical separation provided by the separator sheet 37, and the microwave transmission performance of the microwave transmission arrangement 13, the separator sheet 37 may advantageously be configured to additionally provide for grounding of the hollow waveguide 15. Therefore, referring to FIG. 3A and FIG. 3C, the separator sheet 37 may comprise a dielectric substrate 65, a first conductive layer 67 on a first side of the dielectric substrate 65, a second conductive layer 69 on a second side of the dielectric substrate 65, and a plurality of conductive vias 71 passing through the dielectric substrate 65 and electrically conductively connecting the first conductive layer 67 and the second conductive layer 69. The vias 71 are filled, and not open.

In the example embodiment in FIGS. 3A-C, the first conductive layer 67 of the separator sheet 37 is electrically conductively connected to the first ground plane 47 of the microwave circuit board, and the second conductive layer 69 of the separator sheet is electrically conductively connected to the first end 49 of the hollow waveguide (to the end surface of the hollow waveguide body 53).

To provide the above-mentioned dielectric portion 63 of the separator sheet 37, the first conductive layer 67 of the separator sheet 37 may have an open portion, and the second conductive layer 69 of the separator sheet 37 may have an open portion aligned with the open portion of the first conductive layer 67. This example configuration is schematically illustrated in FIG. 3A and FIG. 3C.

Furthermore, the first conductive layer 67 defines an open channel 73 that is aligned with the patch line 45 of the microwave circuit board 35, to further reduce any impact of the separator sheet 37 on the microwave transmission performance of the microwave transmission arrangement 13.

The person skilled in the art realizes that the present invention by no means is limited to the preferred embodiments described above. On the contrary, many modifications and variations are possible within the scope of the appended claims.

What is claimed is:

1. A microwave transmission arrangement, comprising:
a microwave circuit board including a dielectric carrier, and a first conductor pattern on a first side of the dielectric carrier, the first conductor pattern including a patch for radiating or receiving microwave signals, a patch line, and a first ground plane surrounding the patch and the patch feed line;
microwave transceiver circuitry arranged on the microwave circuit board, the microwave transceiver circuitry having an output for providing microwave signals generated by the microwave transceiver circuitry and an input for receiving microwave signals, wherein the patch line is connected to at least one of the output and the input;
an electrically conductive hollow waveguide extending from a first end to a second end and arranged to guide microwave signals radiated by the patch from the first end towards the second end, and/or guide received microwave signals from the second end towards the first end; and
a separator sheet sandwiched between the microwave circuit board and the first end of the hollow waveguide, the separator sheet being configured to allow passage of microwaves between the patch and the hollow waveguide through the separator sheet,
wherein the separator sheet is included in an encapsulation separating an encapsulated interior of the microwave transmission arrangement from an exterior outside the encapsulation, the patch, the patch line, and the microwave transceiver circuitry being in the encapsulated interior, and the hollow waveguide being in the exterior outside the encapsulation,
wherein the separator sheet is in direct contact with the first side of the microwave circuit board and the first end of the hollow waveguide, so that there is no internal cavity between the first side of the microwave circuit board and the separator sheet.

2. The microwave transmission arrangement according to claim 1, wherein the separator sheet comprises a dielectric portion arranged between the patch and an interior of the hollow waveguide, to allow microwave signals to propagate between the patch and the interior of the hollow waveguide, through the dielectric portion of the separator sheet.

3. The microwave transmission arrangement according to claim 2, wherein a thickness of the dielectric portion of the separator sheet is at least 0.5 mm.

4. The microwave transmission arrangement according to claim 1, wherein the separator sheet comprises:
a dielectric substrate having a first side and a second side opposite the first side;
a first conductive layer on the first side of the substrate;

a second conductive layer on the second side of the substrate; and a plurality of conductive vias passing through the dielectric substrate and electrically conductively connecting the first conductive layer and the second conductive layer.

5. The microwave transmission arrangement according to claim 4, wherein:

the first conductive layer of the separator sheet is electrically conductively connected to the first ground plane of the microwave circuit board; and the second conductive layer of the separator sheet is electrically conductively connected to the first end of the hollow waveguide.

6. The microwave transmission arrangement according to claim 4, wherein:

the first conductive layer of the separator sheet has an open portion; and the second conductive layer of the separator sheet has an open portion aligned with the open portion of the first conductive layer.

7. The microwave transmission arrangement according to claim 1, wherein the microwave circuit board has a second conductor pattern on a second side of the dielectric carrier of the microwave circuit board, opposite the first side, the second conductor pattern including a second ground plane arranged opposite the patch and the first ground plane of the microwave circuit board, wherein the first ground plane and the second ground plane are interconnected by electrically conducting vias extending through the dielectric carrier.

8. The microwave transmission arrangement according to claim 1, wherein the microwave transceiver circuitry comprises a monolithic microwave integrated circuit (MMIC) with a bottom face bonded to the microwave circuit board, a top face opposite the bottom face, and edges connecting the bottom face and the top face.

9. The microwave transmission arrangement according to claim 1, wherein the encapsulation comprises a potting compound at least partly covering the microwave circuit board.

10. A communication and/or measurement system comprising:

the microwave transmission arrangement according to claim 1; and processing circuitry coupled to the microwave transceiver circuitry and configured to control the microwave transceiver circuitry to provide microwave signals and/or to perform signal processing on microwave signals received by the microwave transceiver circuitry.

11. A radar level gauge system for determining the filling level of a product in a tank, comprising:

the microwave transmission arrangement according to claim 1;

an antenna coupled to the second end of the hollow waveguide of the microwave transmission arrangement for radiating an electromagnetic transmit signal from the microwave transmission arrangement towards a surface of the product and for returning an electromagnetic reflection signal resulting from reflection of the electromagnetic transmit signal at the surface back towards the microwave transmission arrangement; and processing circuitry coupled to the microwave transceiver circuitry comprised in the microwave transmission arrangement and configured to determine the filling level based on a timing relation between the transmit signal and the reflection signal.

\* \* \* \* \*